May 5, 1970 S. HANSEN 3,509,636
BUBBLE SEISMOMETER
Filed Oct. 16, 1967 3 Sheets-Sheet 1

INVENTOR.
SIEGFRIED HANSEN,
BY
Allen A. Dicke Jr.,
AGENT.

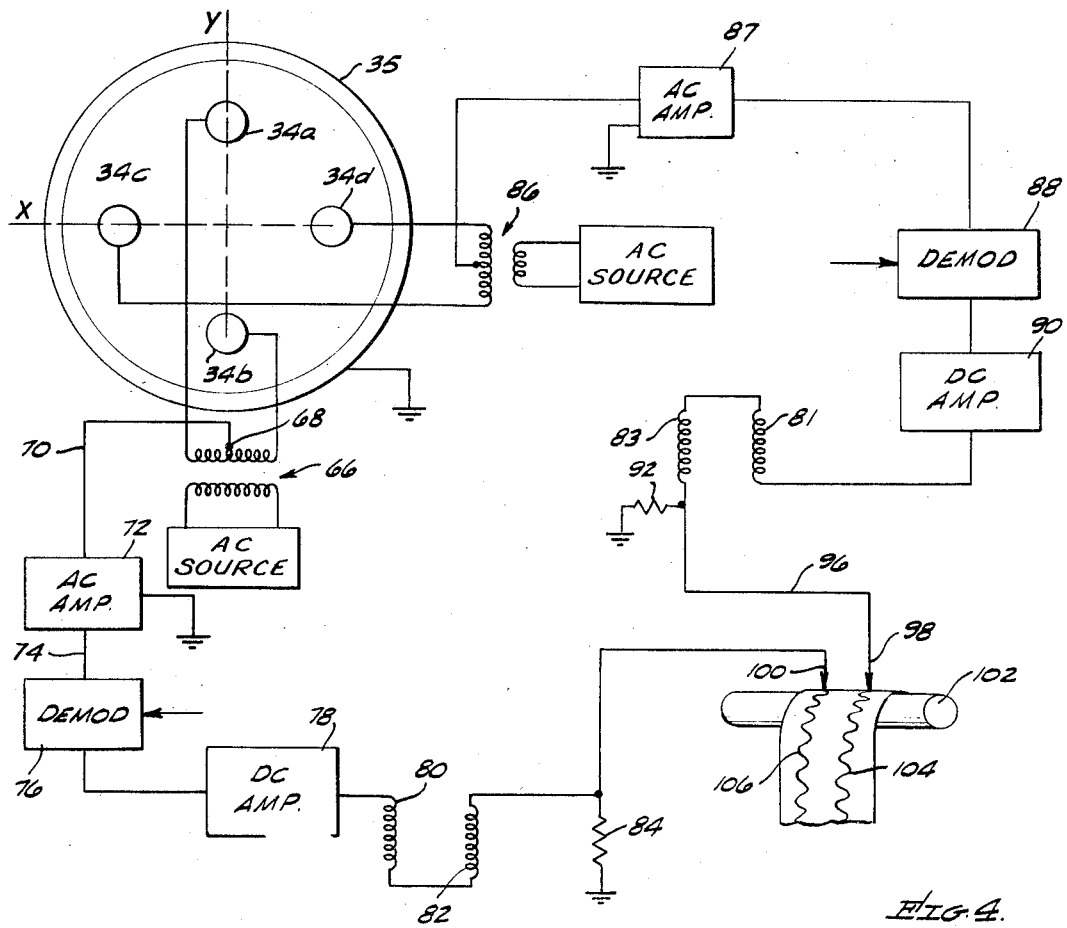
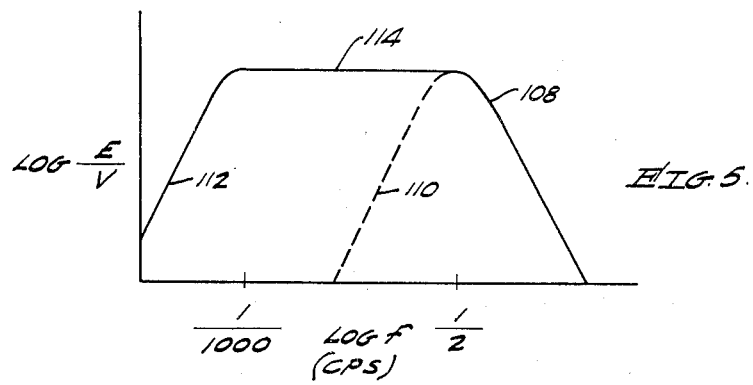

United States Patent Office 3,509,636
Patented May 5, 1970

3,509,636
BUBBLE SEISMOMETER
Siegfried Hansen, Los Angeles, Calif., assignor to Hughes Aircraft Company, Culver City, Calif., a corporation of Delaware
Continuation-in-part of application Ser. No. 519,673, Jan. 10, 1966. This application Oct. 16, 1967, Ser. No. 675,491
The portion of the term of the patent subsequent to Nov. 12, 1985, has been disclaimed
Int. Cl. G01c 9/24; G01p 15/00
U.S. Cl. 33—211    11 Claims

ABSTRACT OF THE DISCLOSURE

The bubble seismometer is an improved device for precisely monitoring the state of tilt of a critical surface with respect to a local reference surface. It has a flat having a bubble moveable along the under surface of the flat in a direction and with a velocity proportional to the tilt or inclination of the critical surface, and an integrally associated control system responsive to movement of the bubble to generate restoring signals proportional to the inclination. The control system signals are applied to a force means to reposition the flat to a level position to make the bubble stationary. The restoring signals are indicative of the degree and direction of displacement of the critical surface and may also be utilized to determine the rate of change of inclination. Since the bubble is in a viscous liquid confined beneath the substantially horizontally positioned flat, the movement of the bubble under the flat is also a function of horizontal earth accelerations so that seismic disturbances are also indicated.

CROSS REFERENCE

This application is a continuation-in-part of application S.N. 519,673, now Patent No. 3,409,993, filed Jan. 10, 1966.

BACKGROUND

This invention relates to an improved instrument for monitoring the inclination of an unstable structure and more particularly, an instrumentation adaptable to both monitor and provide data relating to the geometric orientation of a geological formation or other structure with respect to a local horizontal reference plane.

As indicated in applicant's copending application, S.N. 519,673, now Patent No. 3,409,993, filed Jan. 10, 1966 entitled "Precision Tilt Meter," a need exists for seismic instrumentation of sufficient quality to provide reliable data relating to tthe changes in the tilt of geological formations in the vicinity of a geological fault during the period prior to an earthquake involving the fault. It has been surmised that there may be a significant increased rate of change of tilt just before the incident of an earthquake; and if true, such data would provide a means whereby earthquakes could be reliably predicted. Additionally, equipment of such sensitivity would find most welcome use as a means of both observing and regulating the tilt of other critical surfaces, such as precision optical benches. Other uses of the instrument of the present invention include recording both horizontal and tilting activity in earthquakes, observing the effects of low frequency vibrations and earthquakes on building structures as well as the effects of wind forces on tall buildings, bridges, and the like.

SUMMARY

The present invention is an improvement over the instrumentation of applicant's above-cited copending application in that the tilt meter disclosed therein is a relatively narrow bandpass device which does not generate meaningful signals in the low frequency seismic range. The instrument of the present invention can be operated as a relatively broad bandpass system and is capable of generating meaningful signals from DC to at least 5 cycles per second, thus making it possible to reproduce the seismic band from $1/1000$ to $1/2$ c.p.s. with very little distortion.

Another improvement offered by the bubble seismometer of the present invention is its high degree of thermal stability. It is common knowledge that standard seismometers must be operated in a very constant temperature environment, such as a mine tunnel, and must be protected by a thermal insulating covering. After being placed in operation the conventional instrument must be allowed a period of several hours to acquire thermal stabilization. The bubble seismometer of the present invention shows very little drift even when operated in an ordinary laboratory room without any protective cover whatsoever. In addition, it can be placed in operation with a very brief period after initial setup. This high degree of stability is acquired through the use of a precision support system between the bubble level sensor and the surface or plane under observation which is composed entirely of fused quartz. Furthermore, the stability is enhanced by utilization of a symmetrically distributed construction where the various parts of the bubble level sensor, fused quartz support system and the servo rebalancing system may change dimension, as a result of thermally induced expansion and contraction, without shifting the center of gravity of the entire system.

Accordingly, it is an object of the present invention to provide an improved precision seismometer having increased sensitivity and improved resolution. Another object of the present invention is to provide an improved precision instrument providing a relatively simple system for maintaining a surface or plane substantially parallel to a horizontal reference plane. A further object of the present invention is to provide an improved instrument for determining the tilt of a surface from a substantially parallel relation to a horizontal reference plane. A further object of the present invention is to provide an improved system for sensing the magnitude of departure of the tilt of a surface or plane from that of a local horizontal reference plane which is substantially unaffected by thermally induced dimensional changes. A still further object of the present invention is the provision of an improved system arrangement for sensing the magnitude and direction of departure of the tilt of a surface or plane from that of a local horizontal reference plane which is free from errors resulting from thermal effects on the parts forming the system and a system capable of monitoring the effects of low frequency disturbances on a surface or plane. These and other objects and advantages of this invention will become apparent from the following description taken in conjunction with the specification and considered in conjunction with the accompanying drawings.

DESCRIPTION OF THE DRAWINGS

FIGURE 4 is a schematic drawing of the null balancing circuit and the data presentation system for the bubble sensor of the precision seismometer shown in FIGURE 1.

FIGURE 5 is a graph showing the response of the bubble seismometer.

DESCRIPTION

Figure 1:
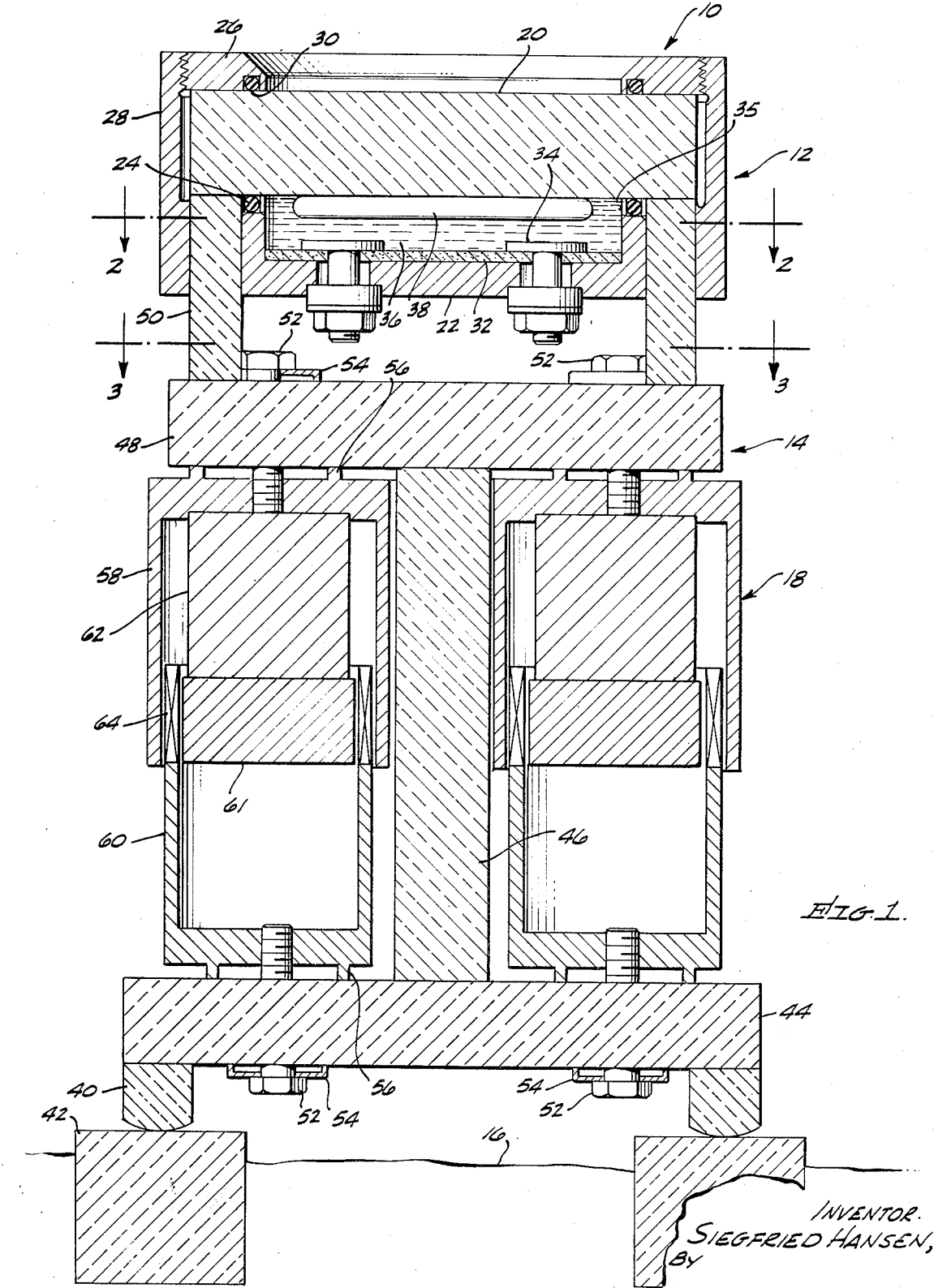
FIGURE 1 is a vertical sectional view showing a preferred embodiment of the precision seismometer of the present invention taken along line 1—1 in FIGURE 2.

Referring to FIG. 1, the basic concept of the improved precision seismometer 10 of the present invention is clearly shown in this figure. Basically, the seismometer comprises a bubble level sensor 12, which is quartz frame generally designated 14 for supporting the sensor in fixed relation with respect to a geologic surface 16 being observed. An example of such a surface would be a rock formation associated with a geological fault, or in other applications of the invention may comprise another critical surface, such as an optical bench. In addition to the above, the basic structure of the seismometer 10 further includes positioning correcting force means 18, which will be described in greater detail in conjunction with FIGURE 4 of the drawings.

The bubble level sensor 12 comprises an optically flat plate or quartz disc 20 and a bubble chamber 22. Chamber 22 is attached in sealed relationship to the flat quartz plate 20 by means of an O-ring gasket 24 which is compressed into sealed engagement against the underface of the quartz plate through the clamping pressure exerted by the clamping ring 26. Clamping pressure is developed by the threaded interconnection of clamping ring 26 with the annular flange of the bubble chamber 22. The clamping ring 26 is sealed by O-ring gasket 30 against the top face of the plate 20 to prevent dust and dirt from entering into the bubble chamber 22.

Figure 2:
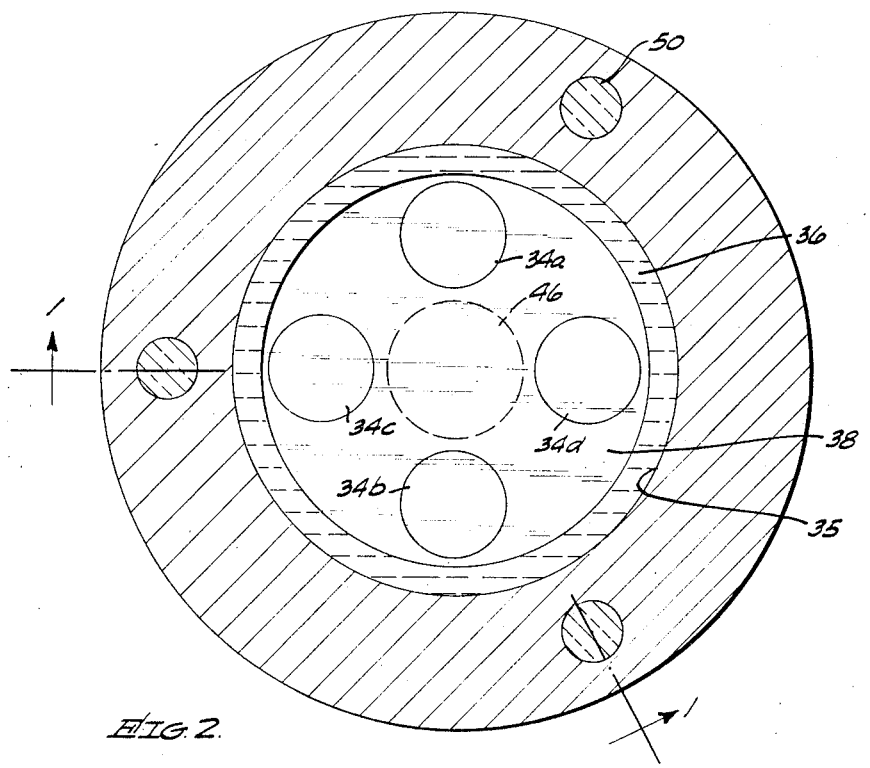
FIGURE 2 is a horizontal sectional view of the precision seismometer of FIGURE 1 taken along line 2—2 in FIGURE 1.

Electrically, the bubble chamber 22 comprises an insulating lining 32, which for example, can be formed of suitable insulating material such as Teflon. The insulating lining 32 permits contacts 34 to be electrically isolated from the conductive ring 35 of the bubble chamber but to be disposed in electrical contact with the conductive liquid 36. Liquid 36 is ethyl alcohol partially filling the bubble chamber 22. The contacts 34 are disposed in an orthogonal array along perpendicularly disposed X and Y axes as can be seen in FIGURE 2. As is later described, the position of the bubble with respect to the contacts materially affects the conductance between these contacts and the conductive ring 35 of the bubble chamber.

As described in applicant's copending application Ser. No. 519,673, now Patent No. 3,409,993, filed Jan. 10, 1966, entitled "Precision Tilt Meter," the undersurface of the quartz disc-shaped plate 20 provides an optically flat surface. The plate 20 is preferably ground to be flat within one micro-inch. The texture of this surface is acquired by employing a grinding technique whereby the surface is scored over 75% of its surface without losing its optically flat configuration.

One method of obtaining such a surface is to use 1,800 carborundum grit that is applied to the surface of the plate with a conventional optical grinding tool. The surface is then abraded for a 2 to 3 minute period. By utilizing such a grinding compound in the above-described manner, the plate will retain an optically flat configuration including miniscule pock marks, interconnected by fine line scorings. The bubble lies against this undersurface. A surface scored in this manner reduces both the surface tension around the peripheral edge of the bubble and also eliminates the formation of a film of impurities that would otherwise develop as a result of the evaporation of the liquid. Such a precaution is necessary to enable the surface to perform as a wick to prevent momentary hesitations of bubble movement that would otherwise adversely affect the response of the sensor.

In this preferred embodiment of the present invention the entire supporting structure between the bubble level sensor and the surface 16 of a geological formation being observed is composed entirely of fused quartz. This selection of material minimizes dimensional changes of the support structure that ordinarily occur whenever the ambient temperature of the environment in which the seismometer is situated changes from the initial condition.

The structure of the support can be clearly seen in FIG. 1. The portion of the support resting on the geological surface 16 comprises three depending base members or feet 40 resting upon previously leveled fused quartz blocks 42 inset in the surface 16. The support structure further comprises a lower circular member 44 having a central stem 46 which supports an upper circular member 48, of similar configuration. Member 48 is provided with three upstanding lugs or pins 50 upon which rests disc 20 of the bubble sensor 12.

As will be described in the description of the operation of the seismometer, force means 18 are utilized to apply pressure between the upper and lower circular members 44 and 48 to cause a slight bending of stem member 46 to thereby tilt the bubble sensor. Since the geologic surface 16 usually is subjected to continuous seismic disruption this releveling process will also be continuous. If by chance the geological surface or other critical surface being observed is in a position where the seismometer is tilted in the initial orientation when the seismometer is set up, the bubble will be returned to a position substantially central with respect to the four contact terminals 34a, 34b, 34c and 34d, see FIG. 2.

In order to attain accurate displacement of the upper circular member 48 and hence the optical flat, the structures forming the force coils 18 are attached to both the upper and lower circular members by means of bolt assemblies 52 which apply uniform clamping forces between the raised edge washers 54 and the annular protrusions 56 formed on each end of the force coil elements. It is important that the forces applied by the bolts between the washers 54 and the protrusions 56 be in alignment with each other to eliminate the possibility of fracturing the fused quartz material forming the upper and lower circular members 44 and 48 of the support.

The force means 18 are units of conventional construction. They comprise telescopically engaging upper and lower cup members 58 and 60, respectively. Each of the cup members is formed of suitable magnetic material whereby a magnetic circuit is maintained therebetween. Each of the force units further includes an alnico core 62 situated in each upper cup member and pole piece 61, all of which are formed of magnetic materials. Windings 64 utilized to actuate the force means 18 are disposed adjacent the top extremity of the lower of the cup members. By referring to FIG. 1, it can be seen that when the electrical windings 64 are energized, the telescopic cup-like members are moved toward each other or away from each other depending upon the direction of current flow in the windings 64. This movement is exerted between the upper and lower quartz plates to flex the fused quartz stem 46 which in turn reorients the spatial disposition of the bubble sensor to bring the bubble 38 to a substantially central state of rest.

FIG. 4 shows the electrical system utilized to cause the bubble to assume a substantially central stationary position in response to tilt changes or to seek such a position when the tilt action is continuous. The contacts 34 which lie along the Y-axis are identified by the reference characters 34a and 34b. Similarly, contacts 34c and 34d are disposed along a perpendicularly disposed X-axis. The disposition of these contacts is such that when the optical flat 18 is disposed in a level orientation, the bubble 38 will be stationary with respect to the contacts 34a through 34d and the intersection of the X and Y coordinates. Any motion of geologic surface 16 will cause the bubble to move, thereby changing the conductance between the contacts and the grounded side wall 35 of the bubble chamber. If, for example, the change is along the direction of the Y axis, an imbalance will be set up in the transformer 66 to which the contacts 34a and 34b are connected. The primary winding of this transformer is provided with a 2,500 c.p.s. reference voltage supplied from a conventional oscillator, which is not shown.

Figure 3:
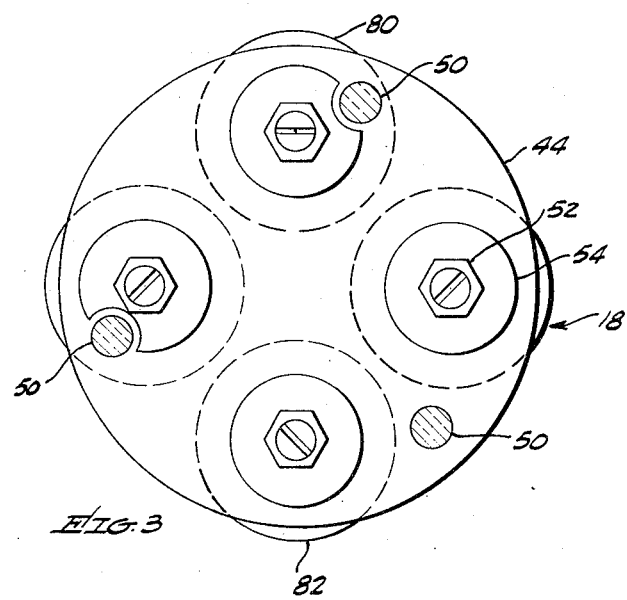
FIGURE 3 is a cross sectional view of the precision seismometer shown in FIGURE 1 taken along line 3—3 in FIGURE 1.

The imbalance signal with respect to the ground reference of the conductive ring 35 appearing at the center tap 68 of the transformer is connected by the conductor 70 to a conventional AC amplifier 72. The output of the amplifier 72 is connected by the line 74 to the input of a conventional demodulator 76 which is also supplied with the 2,500 c.p.s. reference signal. The output of the demodulator 76 is supplied to the input of a single stage balanced output DC amplifier 78, which is also of conventional construction, and thereby provides a balanced DC output of positive or negative polarity according to the direction in which the bubble is displaced with regard to the contact terminals 34a and 34b along the Y axis. The amplified output signal of the DC amplifier 78 is connected in series opposition through the force means windings 80 and 82 which are disposed in line with the Y axis, as shown in FIG. 3. This energization of the force means strains stem member 46 to tilt disc 20 in such a direction to restore the bubble toward the central position. Should the bubble reach the central position, the bridge is balanced and the imbalance signal is absent. In tilt situations, since some imbalance signal is necessary to maintain stem strain equal to tilt, the bubble is sufficiently off center to maintain the necessary imbalance signal. The amount of amplifier gain controls the ratio of bubble displacement from center to amount of steady state tilt. The electrical circuit is completed through the dropping resistor 84 to ground.

In a similar manner the contact terminals 34c and 34d disposed along the X axis are connected to secondary winding of a transformer 86 whose primary winding is also connected to the 2,500 c.p.s. reference signal. The center tap of this transformer is connected through an AC amplifier 87, demodulator 88 and a DC amplifier 90, which is identical to the DC amplifier 78, described in conjunction with the contacts 34a and 34b. The output signal of the DC amplifier 90 is connected through the force means windings 81 and 83 in series opposition connection and through the dropping resistor 92 to ground.

As indicated by the conductors 94 and 96, the outputs of the DC amplifiers 78 and 90, respectively, are connected to drive the first stylus 98 and the second stylus 100, respectively, of a conventional two channel graphic recorder 102. With the latter arrangement, the signals 104 and 106 are representative of the X and Y correction voltages applied to the force means associated with the Y axis and the X axis of the bubble level sensor. The purpose of the graphs 104 and 106 is to provide data whereby both the degree of tilt of the disc 20 and its rate of change of tilt can be obtained by conventional analytical methods. While a graph type recorder 102 has been shown in the circuit of FIG. 4, it is to be understood that any suitable conventional recording means may be utilized such as a tape recorder, or the signals derived from the connections 94 and 96 could be applied to a conventional computer apparatus.

When it is desired to study the tilt of a geological formation such as identified by the reference charatcer 16, the tilt displacement of the formation will cause displacement of bubble 38 from its initial position in a direction having an X and Y componet. Such a displacement of the bubble will change the conductance through the alcohol from contact terminals 34a through 34d to ground. Such a change in the conductance value of the alcohol between these terminals and the grounded annular ring 35 will alter the voltage appearing at the center tap of each of the transformers 66 and 86.

This will cause the force means to apply forces between the upper and lower fused quartz plates 44 and 48 of proper intensity and direction to cause the stem 46 to bend in a direction to cause the bubble level sensor 12 to be displaced in a direciton of tilt so as to bring the bubble 38 to a stationary position. However, as previously described, since the seismic disturbances will usually continuously change the angle of surface 16, the force means will also continuously change the forces applied between the plates 44 and 48 in an effort to seek a level position of the bubble level sensor 12 so that the bubble will remain in a stationary position.

Thus, it is seen that the recorded signals 104 and 106 represent both the direction and magnitude of tilt of the surface 14 and when these signals are analyzed with reference to time, it is possible to obtain the rate of change of tilt.

The above description of operation of bubble seismometer 10 is based on the presumption that the geologic surface 16 will tilt and will not be subjected to horizontal movement. On the other hand, as seen from the structures shown in FIG. 1, when the sesismometer 10 is subjected to horizontal accelerations, the bubble will move in its liquid with respect to contacts 34 and ring 35. The linearity of the bubble response to the acceleration is a function of the physical dimensions of the bubble chamber, bubble size and the viscosity of the liquid which defines the bubble.

FIG. 5 illustrates the response of seismometer 10. The abscissa is the log of the input frequency in cycles per second, while the ordinate is the log of the ratio of electrical signals at magnet coils 80 through 83 to the actual horizontal velocity. When normal, fairly high gains are used in amplifiers 78 and 90, as are ordinarily used in tilt meter service, the response curve is illustrated by the two sloping sides 108 and 110. However, in seisnmometer service, the use of very low gain displaces the sloping side 110 to the left until it occupys a position illustrated at 112. In this case the two curves sides 108 and 112 are joined by a substantially flat top 114. This flat top shows that over a fairly wide range of frequency, the electrical output for overdamped systems is proportional to the ground velocity, assuming sinusodial ground motion. The frequency range covers the desired frequencies of study for seismic purposes. By this means the bubble seismometer produces data by its output voltage which is useful both in measuring tilt and in signaling seismic motion. Furthermore, the range of linearity, shown by the flat top of the curve, extends from $\frac{1}{1000}$ to $\frac{1}{2}$ cycle per second for the particular device tested. Pendulum type seismometers do not produce satisfactory data on the lower end of this range, due to inherent limitations in the pendulum type instruments. Thus, the bubble seismometer of this invention provides for accurate data in a previously unavailable frequency range. The slopping sides 108 and 112 of the curve also produce data. In the region 108, the output is proportional to horizontal displacement of the base, while in the region 112, the output is proportional to horizontal acceleration or to tilt or to a combination of both.

While the basic principle of this invention has been herein illustrated along with a preferred embodiment, it will be appreciated by those skilled in the art that variations in the disclosed arrangement both as to its details and as to the organization of such details may be made without departing from the spirit and scope thereof. Accordingly, it is intended that the following disclosure and the showings made in the drawings will be considered only as illustrative as principles of the invention.

What is claimed is:

1. A bubble seismometer, said bubble seismometer having a base arranged to be supported by a reference surface, the improvement comprising:

a resilient stem mounted on said base, a bubble sensor mounted on said stem;

said sensor comprising a bubble chamber having a flat top thereon and having a bottom, electrolyte liquid and a bubble in said bubble chamber beneath said flat top, said bubble being out of contact with said bottom of said bubble chamber;

a plurality of contacts in said bottom of said bubble chamber, electrical means connected to said contacts to detect the position of the bubble in said bubble chamber;

a plurality of force units connected between said base and said sensor so that electrical actuation of said force units bends said stem and angularly moves said flat top of said sensor with respect to said base; and electrical control means connected to said force units to energize said force units in accordance with bubble position with respect to said contacts in said sensor.

2. The bubble seismometer of claim 1 wherein a frame is mounted on said stem, and said force units and said bubble sensor are mounted on said frame.

3. The bubble seismometer of claim 2 wherein there are four contacts rectilinearly positioned within said bubble chamber and there are four force units rectilinearly arranged around said stem, said contacts being connected through said control means to said force units so that change in position of the bubble within said bubble chamber is detected by said contacts and said force units are energized to bend said stem in a direction to move said flat plate in a direction to stop bubble movement.

4. The bubble seismometer of claim 1 wherein said force units are force coils and said force coils comprise first and second cups, said first cup extending within said second cup and carrying an electric coil thereon, said second cup being magnetically conductive, a permanent magnet in said second cup so that magnetic flux extends through said second cup and through said electric coil so that upon energization of said electric coil forces are created between said first and second cups.

5. The bubble seismometer of claim 4 wherein a frame is mounted on said stem, one of said cups being mounted on said frame and the other of said cups being mounted upon said base.

6. The bubble seismometer of claim 5 wherein said base and said frame are made of fused quartz and said first and second cups carry annular protrusions thereon in engagement with said fused quartz to spread the securement load on said frame and said base.

7. The bubble seismometer of claim 6 wherein bolts extend through said frame and said base to secure said cups to said frame and said base and washers are positioned under said bolts, said washers having raised edges to spread the securement load on said frame and said base.

8. The bubble seismometer of claim 1 wherein said bubble chamber is defined by a grounded ring, a first pair of contacts positioned in said bubble chamber, said first pair of contacts being connected to the secondary of an excitation transformer, the primary of said excitation transformer being connected to an alternating current source, a secondary winding center tap on said excitation transformer, said secondary winding center tap being connected through signal modification means to a first pair of force coils, said first pair of force coils lying in the same plane as said first pair of contacts.

9. The bubble seismometer of claim 8 wherein said first pair of force coils are connected in electrical opposition.

10. The bubble seismometer of claim 8 wherein said electrical modification means comprises a demodulator so that current to said force coils is direct current.

11. The bubble seismometer of claim 8 wherein instrument means is connected to said center tap, said instrument means indicating the force being imposed by said first pair of force coils.

References Cited

UNITED STATES PATENTS

| | | | |
|---|---|---|---|
| 2,713,727 | 7/1955 | Balsam. | |
| 3,077,783 | 2/1963 | Stiles. | |
| 1,352,918 | 9/1920 | Rohbock | 85—50 |
| 2,252,727 | 8/1941 | Pepper | 33—211 |
| 2,702,947 | 3/1955 | Drier | 33—214 |
| 3,020,506 | 2/1962 | Remington | 338—86 |
| 3,051,007 | 8/1962 | Remington | 74—5.47 |
| 3,131,336 | 4/1964 | Hochwald | 317—155.5 |
| 3,343,045 | 9/1967 | Law | 317—153 |

LEONARD FORMAN, Primary Examiner

D. A. DEARING, Assistant Examiner

U.S. Cl. X.R.

73—71.2, 516